L. B. WHITE.
KEROSENE VAPORIZER FOR AUTOMOBILE ENGINES.
APPLICATION FILED JAN. 21, 1916.
1,220,039.
Patented Mar. 20, 1917.
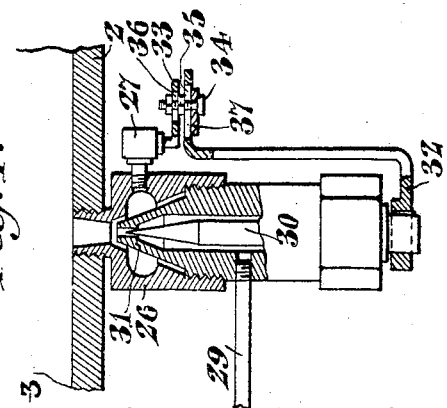
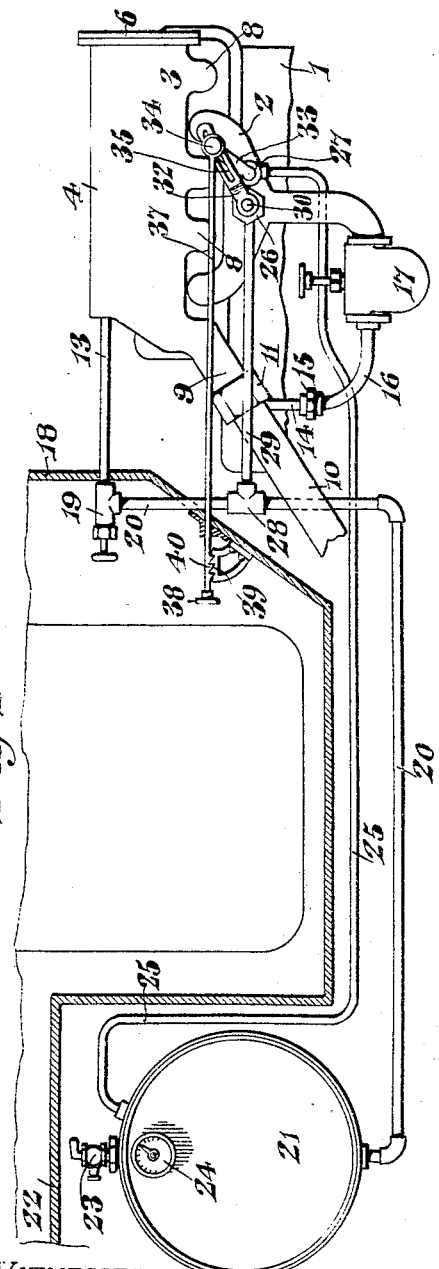
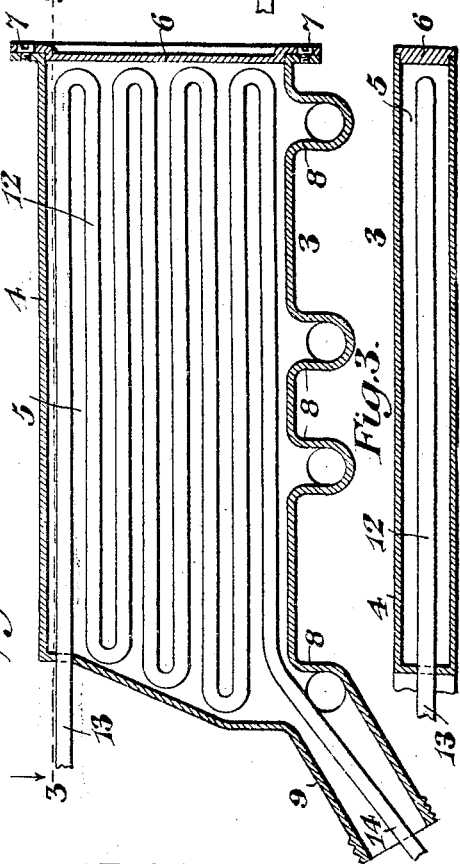
Lewis B. White, INVENTOR
WITNESSES:
BY
Attorney

UNITED STATES PATENT OFFICE.

LEWIS B. WHITE, OF MANSON, NORTH CAROLINA, ASSIGNOR TO WHITE KEROSENE FUEL COMPANY, OF NORLINA, NORTH CAROLINA, A CORPORATION OF NORTH CAROLINA.

KEROSENE-VAPORIZER FOR AUTOMOBILE-ENGINES.

1,220,039.  Specification of Letters Patent.  Patented Mar. 20, 1917.

Application filed January 21, 1916. Serial No. 73,415.

*To all whom it may concern:*

Be it known that I, LEWIS B. WHITE, a citizen of the United States, residing at Manson, in the county of Warren and State of North Carolina, have invented a new and useful Kerosene-Vaporizer for Automobile-Engines, of which the following is a specification.

This invention has reference to vaporizers for kerosene, whereby the latter may be utilized as a fuel for explosion engines employed on automobiles, although, of course, the vaporizer may be used in connection with explosion engines irrespective of the particular use to which they are put. The object of the invention is to permit the employment of heavy liquid fuels for explosion engines, so that such fuels may be readily gasified to be converted into an explosive mixture with air on traversing a suitable carbureter similar to those employed in connection with gasolene as a fuel.

In accordance with the present invention the heavy fuel, of which kerosene is to be taken as an example, is caused to traverse a suitable length of pipe coiled or otherwise disposed in a chamber forming part of the exhaust manifold of the engine, the pipe being fed by kerosene delivered from a suitable reservoir in which air pressure is maintained. The heat of the exhaust gases coming from the engine is sufficient to gasify the kerosene so that on traversing the carbureter an explosive mixture with air is formed and is fed to the cylinders of the engine in the usual way. In order to start the engine there is provided an atomizer for kerosene delivering into the intake manifold of the engine close to the cylinders thereof, so that the atomized kerosene will form a mixture with air of sufficient explosive quantities to serve for starting purposes. Provision is made for opening the atomizer to draw kerosene directly from the feed pipe, and for closing the atomizer after the engine has started, at which time conditions are such that the kerosene becomes vaporized by the heat from the exhaust of the engine.

The invention will be best understood from a consideration of the following detailed description, taken in connection with the accompanying drawings forming part of this specification, with the further understanding that while the drawings show a practical form of the invention the latter is not confined to any strict conformity with the showing of the drawings, but may be changed and modified, so long as such changes and modifications come within the scope of the appended claims.

In the drawings:—

Figure 1 is a side elevation of a portion of an automobile showing the invention applied and illustrating only so much of the vehicle as is necessary for an understanding of the invention.

Fig. 2 is a longitudinal section through the exhaust manifold as arranged for the purposes of the present invention and illustrating the vaporizer coil inclosed in the manifold.

Fig. 3 is a section on the line 3—3 of Fig. 2, distant parts being omitted.

Fig. 4 is a detail of the starting atomizer.

In the drawings the invention is shown applied to a Ford automobile, but it will be understood that the invention is not limited in its use to such particular make of automobile. There is shown a portion of an engine 1 such as is employed upon the Ford or other makes of automobiles, such engine being of the multi-cylinder type, and there is provided an intake manifold 2 and an exhaust manifold 3, the latter differing from that usually provided for explosion engines of the multi-cylinder type in that the body of the manifold has an enlarged portion 4 inclosing a chamber 5 and one end of the body portion 4 is provided with a head 6 held thereto by screws 7 or otherwise, so that access to the interior of the manifold is had when desired. The manifold 3 is provided with the usual inlet necks 8 and an outlet neck 9 at one end, the latter communicating with the customary exhaust pipe 10 to which it is connected by a screw coupling 11 in the particular showing of the drawings. Within the chamber 5 there is lodged a coil of pipe 12, this pipe being usually, though not necessarily, copper pipe of comparatively small diameter, say, about one-eighth inch iron pipe size, although any particular size is not obligatory. The casing 4 is provided as an edge continuation of the manifold 3 and is consequently of relatively little depth, so as to lay close to the side of the engine, and, therefore, occupying but little room. The coil 12 is shown as a flat coil which may be readily introduced into the chamber 5 through the end normally closed by the head 6. One end of the coil has a continuation 13 and the other end of the coil has a continuation 14. The continuation 14 is carried through the neck 9 and thence through one side of the pipe 10 to the exterior thereof, where it may receive a union 15 connecting it to the inlet pipe 16 of a carbureter 17, the latter connecting in the usual manner to the intake manifold 2. The carbureter 17 may be quite similar to carbureters as usually employed upon automobiles, and requires no special description, although it may be found necessary to somewhat differently adjust the carbureter for vaporized kerosene than is necessary for vaporized gasolene.

Since the kerosene enters the carbureter in vaporized and not liquid form, the carbureter becomes in effect a mixer or charge-forming device, and may, therefore, be so termed instead of being designated a carbureter, although the structure need not be changed.

The pipe 13 is extended to and through the dash 18 of the automobile, and there terminates in a controlling valve 19 connected by a pipe 20 to a reservoir 21, which latter, as is customary, may be conveniently located beneath the frame 22 of the seat provided for the operator of the vehicle. It is customary to feed the fuel from the reservoir 21 by pressure, and hence the reservoir is provided with a stop cock 23 adapted to receive a suitable hose or other connection from an air pump. This being a customary practice, the air pump is not shown in the drawings. In order that the operator may be apprised of the pressure conditions within the tank, the latter is provided with a pressure gage 24. Connected to and leading from the air side of the reservoir 21 is a pipe 25 continued to the manifold 2 and there entering an atomizer structure 26. Where the pipe 25 connects to the atomizer 26 it includes a valve 27 which may be of the ordinary spigot type. The pipe 20 includes a T coupling 28, from which there is branched a pipe 29 also entering the atomizer 26, which latter is provided with a needle valve 30 and an injector nozzle 31 controlling the flow of fuel oil through the pipe 29. Air entering the atomizer through the valve 27 passes to the manifold 2 in surrounding relation to the nozzle 31, so that the oil entering the manifold 2 through the nozzle 31 is subjected to a rush of air in surrounding relation to the nozzle, whereby such oil is atomized and consequently enters the manifold 2 in a highly subdivided condition. Under such circumstances the atomized oil forms an explosive mixture with air in the manifold and on being drawn into an engine cylinder will explode when ignited by the usual spark, the force of the explosion being sufficient to start the engine.

The valve 30 is provided exterior to the atmosphere with an operating lever 32 and the valve 27 is provided with an operating lever 33. These two levers are brought into sufficiently close relation and are connected by a bolt 34 sliding in a slot 35 in the lever 32. The lever 33 also has a slot 36 along which the bolt 34 may be adjusted radially with relation to the axis of rocking of the movable member of the valve 27, thus determining the relative movements of the valves 27 and 30. Connected to the bolt 34 is an operating rod 37 extending to and through the dash 18 where it is provided with a manipulating handle 38 within easy reach of an operator and with holding means indicated by a rack 39 with which a tooth 40 of the rod 37 may engage. By this means the valves 27 and 30 may be held in either the open or shut condition, or in some intermediate position at the will of the operator.

Assuming that the atomizer valves 27 and 30 are closed, and also that the main feed valve 19 is closed, and that it is desired to start the automobile, the operator by grasping the handle 38 manipulates the rod 37 in a direction to simultaneously open the valves 27 and 30. This results in an injection of highly atomized oil into the manifold 2 in conjunction with enough air to render the mixture sufficiently explosive for starting purposes. Now, on turning over the crank shaft of the engine, which engine may be assumed to be provided with self-starting means, the proper one of the cylinders is supplied with an explosive mixture, and on passing the spark at the spark plug the explosion of the mixture gives a turning impulse to the engine, and this may continue through the cylinders in order, whereupon there is discharged into the chamber 5 a sufficient amount of hot gases of combustion to heat the pipe 12, such heating being quickly accomplished if the pipe is of copper or similar material. Now, on opening the valve 19 kerosene is forced through the pipe 13 into the pipe 12 and circulates therethrough and finally reaches the carbureter 17. In the passage of the oil through the pipe 12 its temperature is raised sufficiently to vaporize it, wherefore when the fuel reaches the carbureter 17 it is in a vaporized condition and assuming the carbureter to be properly adjusted a highly explosive mixture pasess from the carbureter to the manifold 2, and so to the engine cylinders. The engine having been properly started and the delivery of vaporized fuel to the carbureter 17 having been established, the atomizer 26 is put out of commission by closing the valves 27 and 30 and the engine continues to run in the usual manner, but with a heavy fuel instead of such a light and highly volatile fuel as gasolene.

The vaporizing coil for the fuel is located in an enlargement or chamber constituting part of the exhaust manifold, so that the hot gases of combustion immediately on their escape from the engine cylinders pass about the vaporizing coil and consequently at once heat it to a sufficiently high degree to gasify the oil which therefore reaches the carbureter in a heated gaseous state, so that proper conditions are quickly established for the production of a highly explosive mixture from a heavy fuel, which at ordinary atmospheric temperatures is so slightly volatile that it will not produce a suitable explosive mixture with air.

What is claimed is:—

1. A vaporizing means for the utilization of heavy liquid fuels for explosion engines, comprising an exhaust manifold, and an extended fuel conveying pipe lodged therewithin, said manifold being extended in the direction of its height to form a chamber wholly above the exhaust ports leading from the engine into the manifold and the fuel conveying pipe being extended back and forth in the direction of the length of the manifold, whereby the hot products of combustion immediately on leaving the engine cylinders distribute through the chamber in the manifold and heat all parts of the fuel conveying pipe within said manifold.

2. A means for the utilization of kerosene or the like as a fuel for explosion engines, comprising an exhaust manifold having a side extension immediately adjacent to the ports connecting the manifold to the engine cylinders, said manifold having the end remote from the exhaust end provided with a removable head for access to the interior of the manifold, and a coil of pipe introduced into the manifold through the end provided with the removable head and having inlet and outlet portions extending to the exterior of the manifold through that end of the latter remote from the removable head.

3. A means for the utilization of kerosene or the like as a fuel for explosion engines having intake and exhaust manifolds, comprising an exhaust manifold structure formed with a chamber with a coil of pipe therein having one end provided with means for connection to a supply of fuel, a charge forming device between the other end of the coil of pipe and the intake manifold, and an atomizer having means for connecting it to the supply of fuel and means for connecting it to a supply of air under pressure and also with means for simultaneously controlling the inlet of fuel and air, said atomizer discharging into the intake manifold of the engine.

4. A means for the utilization of kerosene or the like as a fuel for explosion engines provided with intake and exhaust manifolds, comprising an exhaust manifold having an enlargement constituting a chamber, a coil of pipe therein having inlet and outlet ends extending to the exterior of the manifold, a charge forming device connected to the outlet end of the coil and to the intake manifold of the engine, a reservoir for fuel adapted to have air pressure established therein, a pipe leading from the reservoir to the inlet end of the coil and including a valve for controlling the flow of fuel to said coil, an atomizer for the fuel connected to and discharging into the intake manifold of the engine, a fuel connection between the fuel pipe and the atomizer, an air connection between the air side of the reservoir and the atomizer, and means under the control of an operator for simultaneously controlling the air and fuel inlets to the atomizer.

In testimony, that I claim the foregoing as my own, I have hereto affixed my signature in the presence of two witnesses.

LEWIS B. WHITE.

Witnesses:
JOHN H. SIGGERS,
DAVID R. WAGNER.